United States Patent [19]

Kohl et al.

[11] 4,055,280
[45] Oct. 25, 1977

[54] DIVERTER VALVE ASSEMBLY FOR ICE DISTRIBUTION SYSTEMS

[75] Inventors: Vance L. Kohl; Joseph R. Spinner, both of Albert Lea, Minn.

[73] Assignee: King-Seeley Thermos Co., Ann Arbor, Mich.

[21] Appl. No.: 691,355

[22] Filed: June 1, 1976

[51] Int. Cl.² .............................................. B65H 3/60
[52] U.S. Cl. ...................................... 222/70; 62/344; 137/625.46
[58] Field of Search .................... 221/203, 10; 222/70, 222/56; 141/198; 137/625.46; 62/344; 235/92; 119/53, 53.5, 54, 56, 52 AF

[56] References Cited

U.S. PATENT DOCUMENTS

| 3,498,328 | 3/1970 | Mylting | 137/625.46 X |
| 3,674,123 | 7/1972 | Lewis et al. | 137/625.46 X |
| 3,877,241 | 4/1975 | Wade | 62/344 X |

Primary Examiner—Stanley H. Tollberg
Attorney, Agent, or Firm—Harness, Dickey & Pierce

[57] ABSTRACT

A diverter valve assembly for use in an ice distribution system having an ice source and first and second ice delivery stations, the valve assembly comprising a valve body having an inlet section communicable with the ice source, and first and second outlet sections communicable with the first and second delivery stations, respectively; the valve assembly including a valve body having a central valve chamber communicable with the inlet and outlet sections and having a rotatable valve element disposed therein; an electrically energized motor for selectively rotating the valve element whereby to selectively communicate ice being supplied from the ice source to selected of the ice delivery stations, and a control system for use with the valve assembly, whereby to assure against actuation of the valve element during the delivery of ice to the valve assembly.

16 Claims, 5 Drawing Figures

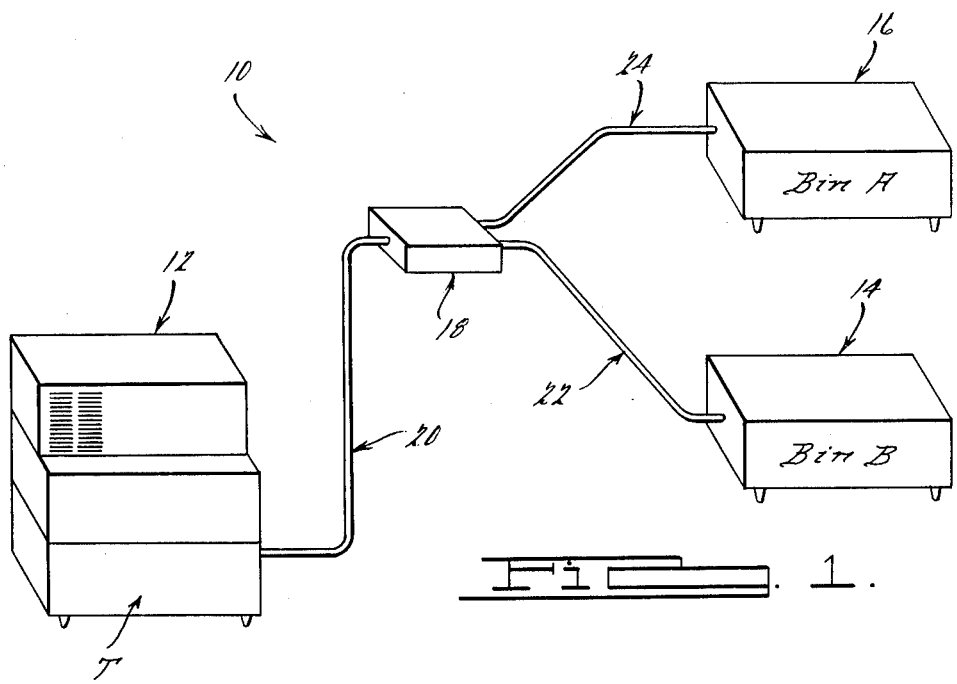
FIG. 1.
FIG. 2.
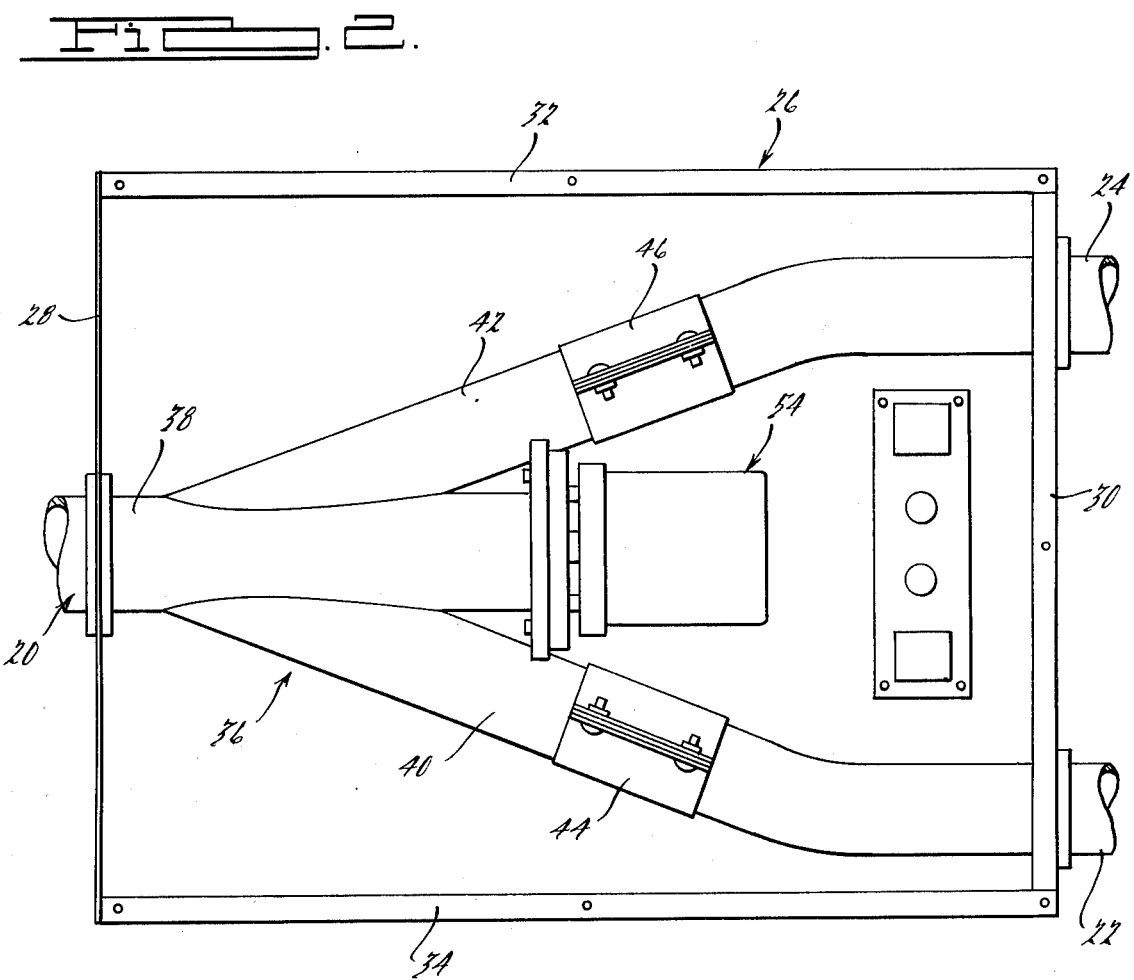

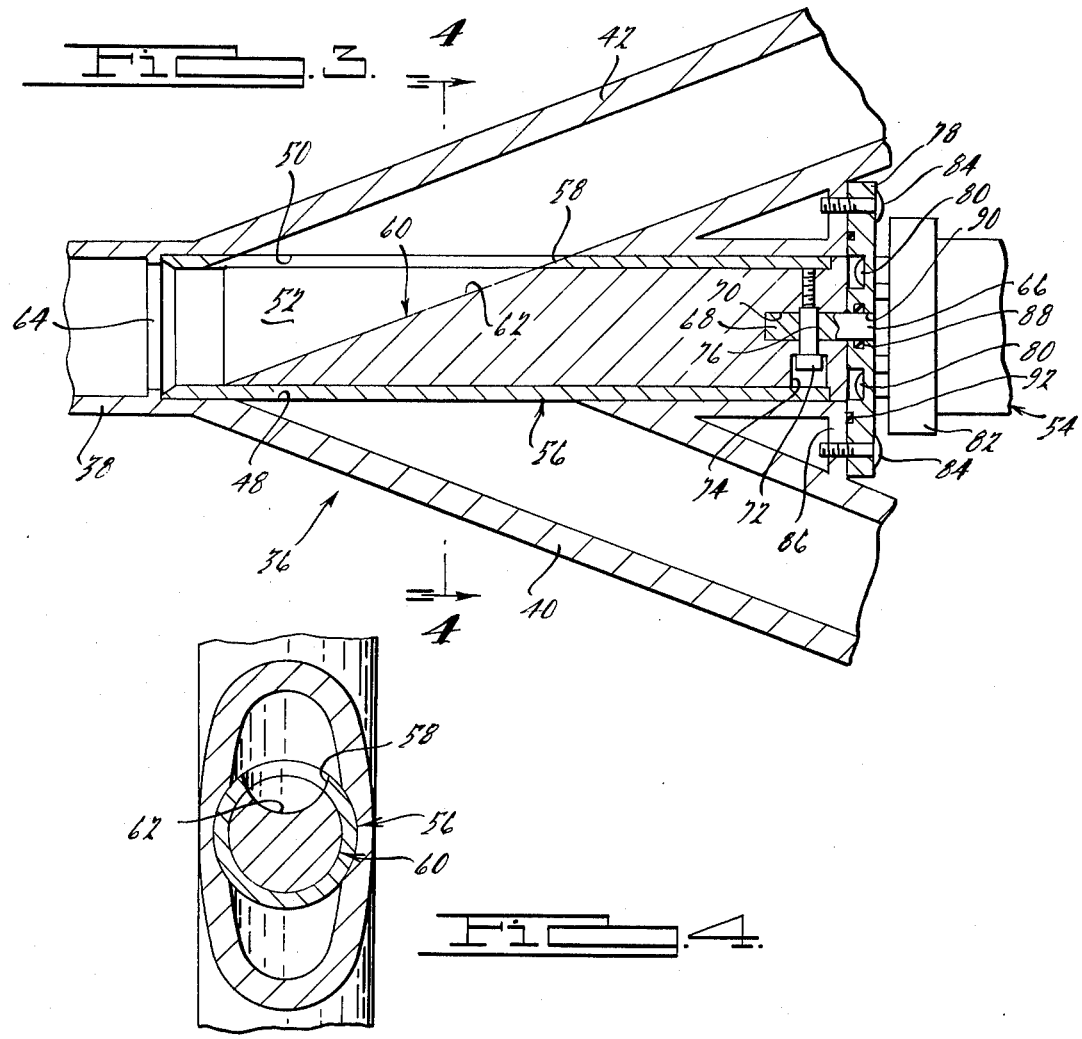
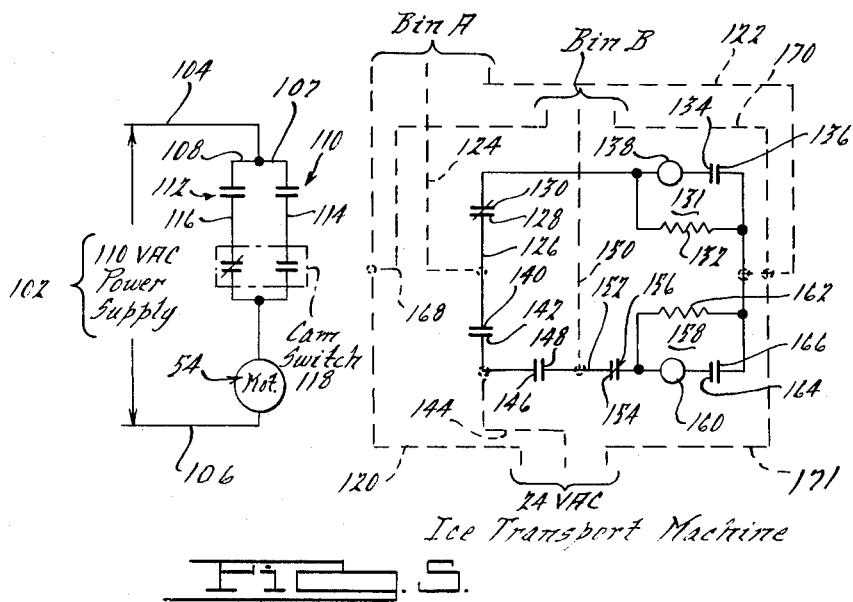

DIVERTER VALVE ASSEMBLY FOR ICE DISTRIBUTION SYSTEMS

SUMMARY OF THE INVENTION

This invention relates generally to ice making and distributing systems and particularly, to a new and improved ice diverting valve for use with ice distribution system having an ice source, such as an ice-making machine, and two or more remotely located ice delivery or dispensing stations. Specifically, the present invention is designed to be operated with an ice making and distributing system such as is shown in U.S. patent application Ser. No. 622,151, filed Oct. 14, 1975, for Ice Transport and Dispensing System, which is incorporated by reference herein.

U.S. Pat. No. 3,580,416 discloses an ice distribution system wherein ice in cube or other form is delivered through a conduit to remotely located dispensing or storage stations by means of a high velocity flow of air. In such systems, it is desirable to provide some type of diverting valve whereby ice and the associated conveying fluid may be selectively directed or diverted to two or more remotely located dispensing or storing stations, depending upon the quantity of ice contained in the respective ice reservoirs thereof, whereby to obviate the need for completely separate or independent conveying conduits between each of the remotely located stations and the associated ice-making machine. The present invention is directed toward such a diverter valve and it is accordingly a general object of the present invention to provide a new and improved diverter valve assembly which may be used in the aforesaid type of ice distribution and/or delivery systems.

It is a more particular object of the present invention to provide a new and improved diverter valve assembly that is extremely economical to manufacture and simple to operate, and which minimizes to the extreme, any pressure drop of a conveying fluid as the ice is being transferred through the valve assembly.

It is another object of the present invention to provide a new and improved diverter valve, as above described, which requires no special or separate drain for ice melt water.

It is still a further object of the present invention to provide a new and improved diverter valve assembly of the above described type that includes control means which assures that the valve assembly is purged of all ice therein preparatory to actuation thereof.

It is a further object of the present invention to provide a new and improved diverter valve assembly wherein the direction of ice movement is selected so as to minimize any drop in the velocity of the ice being communicated therethrough, and which permits convenient assembly of the component parts of the valve assembly.

It is still another object of the present invention to provide a new and improved diverter valve assembly that can be manufactured with readily available materials and which satisfies the sanitary requirements which are imposed by Federal, State and local municipalities with regard to the handling of ice for use in beverages, etc.

Other objects and advantages of the present invention will become apparent from the following detailed description taken in conjunction with the accompanying drawings.

BRIEF DESCRIPTION OF THE DRAWINGS

FIG. 1 is a schematic representation of an ice making and distributing system incorporating the diverter valve assembly of the present invention therein;

FIG. 2 is a top elevational view of the diverter valve of the present invention, as shown with the cover of the enclosure thereof removed;

FIG. 3 is an enlarged cross-sectional view of the diverter valve body and valve element incorporated in the present invention;

FIG. 4 is a fragmentary transverse cross-sectional view taken substantially on line 4—4 of FIG. 3, and FIG. 5 is a schematic representation of the electrical control circuitry incorporated in the valve assembly of the present invention.

DETAILED DESCRIPTION OF A PREFERRED EMBODIMENT

Referring now in detail to the drawings and in particular to FIG. 1 thereof, ice dispensing system 10 is shown as comprising ice-making machine 12, an ice transport machine T, and a pair of remotely located ice storage and/or dispensing enclosures or stations 14 and 16 having ice bins A and B, respectively. In accordance with the present invention, the system 10 is provided with an ice distributing or diverting assembly 18 which is communicable via an inlet conduit 20 with the ice transport machine T and via a pair of outlet conduits 22 and 24 with the enclosures 14 and 16, respectively. Generally speaking, the ice-making machine 10 is intended to produce ice in cube or other form, and the ice transport machine T functions to transfer such ice through the conduits 20, 22 and 24 to the remotely located enclosures or stations 14 and 16. The ice transport machine T may, by way of example, be of the type shown and described in the previously identified patent application and patent which are owned by the assignee hereof. The enclosures 14, 16 may merely consist of insulated ice storage containers, or alternatively, they may include some type of dispensing means by which controlled quantities of ice may be dispensed into containers, such as drinking glasses or the like. The diverting assembly 18 is intended to selectively control the flow of ice from the conduit 20 to the respective enclosures 14, 16 in accordance with the ice levels therein. For example, if the ice level in the enclosure 14 drops below some predetermined level, a control signal will be produced by a suitable ice level sensing mechanism and be transmitted to the ice-transport machine T. Receipt of such a signal by the machine T will result in ice being communicated through the conduit 20 to the ice distributing or diverting assembly 18 from where such ice will be communicated through the conduit 22 to the enclosure 14. Conversely, if the ice level within the enclosure 16 drops below some predetermined level or magnitude, the assembly 18 will suitably actuated whereby ice being transmitted from the transport machine T and conduit 20 will be routed via the conduit 24 to the enclosure 16, as opposed to through the conduit 22 to the enclosure 14, as will hereinafter be described in detail.

The assembly 18, as best seen in FIG. 2, comprises an external housing or enclosure 26 having an inlet side 28 through which the inlet conduit 20 extends, and an outlet side 30 through which the outlet conduits 22,24 extend. The enclosure 26 also comprises longitudinal sides 32, 34 that extend between the inlet and outlet sides 28, 30. Disposed interiorly of the enclosure 26 is an ice diverting valve, generally designated by the numeral 36, that includes an inlet section 38 which is communicable with the conduit 20 and a pair of diverging outlet sections 40, 42 respectively communicable with the conduits 22, 24. The sections 38, 40, 42 of the valve 36 are generally cylindrical or tubular shaped in transverse cross section and means in the form of a pair of suitable sleeve-like couplings 44 and 46 may be utilized for connecting the sections 40, 42 to the adjacent ends of the conduits 22, 24, as best seen in FIG. 2. A similar type coupling (not shown) may be utilized for connecting the inlet section 38 of the valve 36 to the inlet conduit 20, as will be appreciated by those skilled in the art. Preferably, the connections between the conduits 20–24 and the valve sections 38–42 are provided in a fluid and air-tight manner so as to preclude any leakage of the high velocity flow of air being transmitted thereto and/or any ice melt water which may exist in the system. As best seen in FIG. 3, the inlet section 38 of the valve 36 is formed with a pair of diametrically opposed openings 48, 50 which are respectively communicable with the interior of outlet sections 40, 42 of the valve 36.

Disposed interiorly of the inlet section 38 is a rotatable valve element, generally designated by the numeral 52, which is adapted to function in selectively controlling the flow of ice from the inlet section 38 to either the outlet section 40 or the outlet section 42, depending upon which of the ice storage and/or dispensing enclosures 14 or 16 is calling for the delivery of ice. The valve element 52 is adapted to be selectively actuated or rotated by means of an electrically energized motor, generally designated by the numeral 54, which is mounted at the opposite end of the inlet section 38 from the end thereof which is connected to the inlet conduit 20, as best seen in FIGS. 2 and 3. The valve element 52 comprises an elongated tubular member 56 having an outer diameter which is slightly smaller than the inner diameter of the valve section 38 and is adapted to be rotatable therein. The tubular member 56 is formed with an elongated opening 58 in one side thereof and is provided with an interior plug member 60 which is formed with an inclined face 62 that extends from the "downstream" edge of the opening 58 to the diametrically opposite side of the tubular member 56 adjacent the end thereof which confronts the inlet section 38. The inclined face 62 is of a generally arcuate, concave configuration to provide a smooth curved surface that conforms with the general cylindrical shape of the interior of the valve sections 38, 40 and 42, as best seen in FIG. 4. The end of the rotatable valve element 52 opposite the motor 54 is adapted to bear against a radially inwardly extending shoulder 64 formed in the interior of the inlet section 38 of the valve 36. The opposite end of the valve element 52 is adapted to be operatively connected to the output shaft 66 of the motor 54 which, as best seen in FIG. 3, is arranged coaxially of the section 38 and valve element 52. The output shaft 66 comprises a terminal end portion 68 that is telescopically received within a blind bore 70 formed in the plug 60. Means in the form of a suitable diametrically extending locking bolt or the like 72 extends through cross bores 74 and 76 in the plug 60 and output shaft 66 for securing the shaft 66 and valve element 52 against relative rotational movement. The motor 54 is operatively mounted on a suitable mounting plate 78 by means of screws, bolts, or the like 80, which screws 80 are threadably received within suitable internally threaded bores in the motor housing 82. The mounting plate 78 is in turn secured by means of suitable screws, bolts, or the like 84 to a radially disposed mounting flange 86 which extends radially outwardly from the central section 38 of the valve 36 between the sections 40, 42 thereof. Means in the form of a suitable O-ring seal 88 is provided interjacent the outer periphery of the motor output shaft 66 and the inner periphery of a bore 90 formed in the mounting plate 78 through which the shaft 66 extends. A similar O-ring sealing element 92 is provided between the mounting plate 78 and the mounting flange 86, the seals 88, 92 functioning to prevent fluid leakage or the like out of the diverting valve 36. It should be noted that the sections 38, 40 and 42 of the valve 36 may comprise sections of conduit fabricated of a suitable molded plastic material, such as polyvinylchloride (PVC) which are suitably formed and joined at the intersections of the sections 38, 40 and 42. Alternatively, the sections 38, 40 and 42 may be of a one-piece molded construction, depending upon the desired manufacturing techniques. Similarly, the valve element comprising the tubular member 56 and plug 60 may be fabricated in a one-piece manner instead of utilizing separate components 56 and 60, as described herein.

Referring now in detail to the construction and operation of the electrical control circuit of the assembly 18 of the present invention, as illustrated in FIG. 5, an exemplary electrical control system is shown which is adapted to be energized by means of a suitable source of 110 Volt A. C. power, generally designated by the numeral 102. The electrical control circuit includes a pair of primary conductors 104 and 106, the former of which is communicable with conductors 107 and 108 that are respectively communicable with a pair of motor relays 110 and 112 and conductors 114 and 116 to a cam operated switch 118. The switch 118 is in turn connected to one terminal of the motor 54, the other terminal of which is connected with the primary conductor 106, as illustrated. The cam operated switch 118 may be of any suitable single pole, double throw construction and is adapted to effect deenergization of the motor 54 after the same has rotated the valve element 60 180° from its position diverting ice to the outlet section 42, for example, to the outlet section 40. By way of example, the cam switch 118 may be operated by a cam having a pair of diametrically opposed lobes or eccentric portions which are adapted to be engaged by a suitable cam follower for opening and closing the switch armature (not shown). The motor 54 preferably operates such that the drive shaft thereof moves or rotates continuously in a single direction in response to operation of the cam switch 118; however, it is contemplated that the motor 54 could be of the reversible type and reverse the direction of rotation of the output shaft 66 in response to operation of the cam switch 118, as will be appreciated by those skilled in the art.

The electrical control circuit which is shown in FIG. 5 is communicable with two remotely located bins, generally designated as bin A and bin B. Additionally, the control circuit is communicable with an associated source of ice, such as the ice transport machine T hereinabove referred to. The control circuit is preferably operable by a control signal voltage of 24 Volts A. C. and includes a 24 Volt power conductor 120 and with a 24 Volt neutral conductor 122. A signal conductor 124 from bin A is communicable with conductor 126 which is in turn connected to terminals 128 and 130 of relay 112. The contacts 128 and 130 are normally closed and complete a circuit to a time delay circuit, generally designated by the numeral 131. The circuit 131 includes a heater coil 132, time delay contacts 134 and 136 and coil 138 of the relay 110. Conductor 126 is also communicable with contacts 140, 142 of relay 110, which contacts 140, 142 are normally open and communicate via conductor 144 with the associated ice transport machine, such as is shown in the aforementioned pending patent application. Conductor 144 is also communicable via normally open contacts 146 and 148 with conductor 150 from bin B. Conductor 150 from bin B is also connected via conductor 152 via normally closed relay contacts 154 and 15 with a second time delay circuit, generally designated by the numeral 158. The circuit 158 is similar to the aforementioned circuit 131 and includes the coil 160 of relay 112, a heater element 162 and time delay relay contacts 164 and 166. Bins A and B are connected via conductors 120 and 168, and bin B is connected via conductors 170 and 171 with the ice transport machine T, as illustrated.

Referring now in detail to a typical operational cycle of the above described electrical control circuit, assuming that the various relay contacts are in their respective positions shown in FIG. 5, and assuming that bin A is calling for ice, a control signal is produced at bin A and is communicable via conductor 124 and normally closed contacts 128 and 130 of relay 112 to the time delay circuit 131. When this signal is received by the circuit 131, the heater coil 132 thereof will be energized, and after the heater has been energized for a predetermined length of time, the normally open time delay relay contacts 134 and 136 will close. Upon closing of the contacts 134, 136, a circuit is completed to relay coil 138 which in turn causes relay 110 to close and a circuit being completed to the motor 54. As previously mentioned, upon energization of the motor 54, the diverter valve will rotate toward a position diverting ice to bin A, and this circuit will remain closed until the signal device at bin A opens, resulting in the relay coil 128 dropping out and contacts 140, 142 opening. At this time, contacts 154, 156 return to their normally closed position. When the cam switch 118 opens, the diverter valve will be properly positioned to divert ice toward bin A. It is to be noted that when relay 110 closes, a circuit is completed with the ice transport machine through the contacts 140 and 142 of relay 110, with the result that the ice transport machine is energized and ice is delivered to bin A through the diverter valve and associated conduit system.

As such time as bin A has been supplied with a predetermined amount of ice, and the thermostatic or signal device therein so indicates, the control signal to the transport machine T will cause this machine to be deenergized; however, the diverter valve will remain in the position diverting ice to bin A until such time as a signal is received from bin B indicating that ice is to be supplied to bin B. When the signal from bin B is received at the diverter valve control circuit calling for ice to be delivered to bin B, such signal passes through the closed contacts 154, 156 of relay 110 to the time delay circuit 158. Such signal effects energization of the heater 162 for a predetermined period of time, after which the normally open contacts 164, 166 close completing a circuit to the relay coil 160 of the relay 112. When this occurs, current is supplied via the closed relay 112 to the motor 54 which results in energization of the motor 54 causing the diverter valve to be rotated to the position diverting ice to bin B. As such time as bin B becomes full of ice and the thermostat or signal device therein is satisfied, the diverter valve remains in the position for diverting ice to bin B until such time as a signal from bin A is received. It is to be noted that each bin signal must pass through normally closed contacts of the other relay, i.e., relays 110 or 112, whereby to assure that only one bin can signal at a time. It is also to be noted that the use of the time delay circuits 131 and 158 assures that no ice is transported to either bin A or to bin B while the diverter valve is rotating from one position to the other position. Moreover, even though the ice transport machine T and diverter valve are energized at the same time when either bin A or bin B calls for ice, because the transport machine T is disposed at a substantially remote location relative to the diverter valve, the diverter valve, which rotates at approximately one-half rpm, will be repositioned before such time as the ice originating from the transport machine T reaches the diverter valve. Hence, no damage can occur to the diverter valve by ice being communicated therethrough while the valve element is being repositioned to communicate ice from bin A to bin B or vice versa.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:
1. A diverter valve assembly for an ice distributing system including an ice source and first and second ice delivery stations,
   said valve assembly comprising a generally cylindrically-shaped valve body having an inlet section communicable with the ice source and first and second outlet sections communicable with the first and second delivery stations, respectively,
   said valve body having a central cylindrical valve chamber communicable with said inlet and outlet sections and having a rotatable valve element located coaxially therein,
   said valve element being of a generally cylindrical shape and having an outer diameter approximately equal to the diameter of said valve chamber having an ice blocking portion and an ice deflecting portion, and
   electrically energized motor means for selectively rotating said valve element between a first position wherein said blocking portion prevents the transfer of ice from said inlet section to said first outlet section and said deflecting portion permits the transfer of ice from said inlet section to said second outlet section, at a second position wherein said blocking portion prevents the transfer of ice from said inlet section to said second outlet section and said deflecting portion permits the transfer of ice from said inlet section to said first outlet section.

2. The invention as set forth in claim 1 which includes a drive shaft arranged coaxially of the axis of rotation of said valve element for effecting rotation thereof relative to said valve body.

3. The invention as set forth in claim 1 wherein said outlet section of said valve body includes a pair of diametrically oppposed elongated openings which are communicable with said first and second outlet sections.

4. The invention as set forth in claim 1 wherein said valve chamber, said inlet section and first and second outlet sections are all generally circular in transverse cross-section.

5. The invention as set forth in claim 1 wherein at least one of said ice delivery stations includes means for sensing the quantity of ice therein and for producing a control signal in response to a predetermined magnitude of ice at said one station, and wherein said distribution system includes means for providing a high velocity flow of air in said system for transferring ice therewithin.

6. The invention as set forth in claim 5 which includes timing means for preventing energization of said motor when said source of operating fluid is actuated, and wherein said motor is selectively operable in response to said control signal.

7. The invention as set forth in claim 5 which includes time delay means for energizing said motor means a predetemined time after receipt of said control signal, whereby any ice within the system will be purged preparatory to actuation of said valve element.

8. In combination in a material distributing system,
a diverter valve assembly for selectively communicating material between a first conduit and a second or third conduit,
said assembly comprising a generally cylindrically-shaped valve body having a first section operably connected with the first conduit, and a second section operably connected with the second and third conduits,
said valve body defining a generally cylindrical valve chamber,
a generally cylindrically-shaped valve element rotatably disposed coaxially within said chamber and including a blocking portion and a deflecting portion, and
means for selectively moving said valve element within said valve body between a first position wherein said blocking portion prevents material transfer between said first and third conduit and said deflecting portion permits material transfer between said first and second conduits, and a second position wherein said blocking portion prevents material transfer between said first and second conduits and deflecting portion permits material transfer between said first and third conduits.

9. The invention as set forth in claim 8 wherein said valve element is rotatably mounted within said valve body which includes electrically energized motor means for causing rotation of said valve element.

10. The invention as set forth in claim 8 which includes an ice source and wherein said second and third conduits are communicable with remotely located ice delivery stations, said ice source including a source of a high velocity flow of air for communicating ice through said conduits from said source to said delivery stations.

11. The invention as set forth in claim 10 wherein said valve body includes a pair of diametrically opposed openings, and wherein said openings are communicable with said second and third conduits, respectively.

12. The invention as set forth in claim 11 wherein said valve chamber, said inlet section and first and second outlet sections are all generally circular in transverse cross-section.

13. The invention as set forth in claim 10 wherein at least one of said ice delivery stations includes means for sensing the quantity of ice therein and for producing a control signal in response to a predetermined magnitude of ice at said one station, and wherein said distribution system includes means for providing a high velocity flow of air in said system for transferring ice therewithin.

14. The invention as set forth in claim 13 which includes timing means for preventing energization of said motor when said source of operating fluid is actuated, and wherein said motor is selectively operable in response to said control signal.

15. The invention as set forth in claim 13 which includes time delay means for energizing said motor means a predetermined time after receipt of said control signal, whereby any ice within the system will be purged preparatory to actuation of said valve element.

16. The invention as set forth in claim 4 wherein said first and second outlet sections are arranged in a common plane and at an angle of approximately 20° from the axis of rotation of said valve element.

* * * * *